(12) United States Patent
Troy et al.

(10) Patent No.: US 10,607,409 B2
(45) Date of Patent: Mar. 31, 2020

(54) SYNTHETIC GEOTAGGING FOR COMPUTER-GENERATED IMAGES

(71) Applicant: The Boeing Company, Chicago, IL (US)

(72) Inventors: James J. Troy, Issaquah, WA (US); Christopher D. Esposito, Issaquah, WA (US); Vladimir Karakusevic, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/213,727

(22) Filed: Jul. 19, 2016

(65) Prior Publication Data

US 2018/0025543 A1   Jan. 25, 2018

(51) Int. Cl.
| | |
|---|---|
| *G06T 19/00* | (2011.01) |
| *G06T 15/20* | (2011.01) |
| *G06T 17/00* | (2006.01) |

(52) U.S. Cl.
CPC ............ *G06T 19/003* (2013.01); *G06T 15/20* (2013.01); *G06T 17/00* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 6,031,536 A | * | 2/2000 | Kamiwada .......... G06F 3/04815 345/427 |
| 6,738,076 B1 | | 5/2004 | Mandavilli et al. |
| 7,643,893 B2 | | 1/2010 | Troy et al. |
| 7,813,830 B2 | | 10/2010 | Summers et al. |

(Continued)

FOREIGN PATENT DOCUMENTS

| | | |
|---|---|---|
| WO | 2011066452 A2 | 6/2011 |
| WO | 2014116231 A1 | 7/2014 |

OTHER PUBLICATIONS

Elvins, T. Todd, David R. Nadeau, and David Kirsh. "Worldlets—3D thumbnails for wayfinding in virtual environments." Proceedings of the 10th annual ACM symposium on User interface software and technology. ACM, 1997.*

(Continued)

*Primary Examiner* — Zhengxi Liu
(74) *Attorney, Agent, or Firm* — Ostrager Chong Flaherty & Broitman P.C.

(57) ABSTRACT

Systems and methods for constructing and saving files containing computer-generated image data with associated virtual camera location data during 3-D visualization of an object (e.g., an aircraft). The process tags computer-generated images with virtual camera location and settings information selected by the user while navigating a 3-D visualization of an object. The virtual camera location data in the saved image file can be used later as a way to return the viewpoint to the virtual camera location in the 3-D environment from where the image was taken. For example, (Continued)

these tagged images can later be drag-and-dropped onto the display screen while the 3-D visualization application is running to activate the process of retrieving and displaying a previously selected image. Multiple images can be loaded and then used to determine the relative viewpoint offset between images.

10 Claims, 5 Drawing Sheets

(56) References Cited

U.S. PATENT DOCUMENTS

| | | | |
|---|---|---|---|
| 7,859,655 B2 | 12/2010 | Troy et al. | |
| 8,044,991 B2 | 10/2011 | Lea et al. | |
| 8,199,194 B2 | 6/2012 | Troy et al. | |
| 8,447,805 B2 | 5/2013 | Troy et al. | |
| 9,182,487 B2 | 11/2015 | Troy et al. | |
| 2005/0251462 A1 | 11/2005 | Nykamp | |
| 2006/0119601 A1 | 6/2006 | Finlayson et al. | |
| 2008/0247636 A1 | 10/2008 | Davis et al. | |
| 2010/0177120 A1* | 7/2010 | Balfour | G06T 19/20 345/647 |
| 2010/0188503 A1 | 7/2010 | Tsai et al. | |
| 2011/0235923 A1* | 9/2011 | Weisenburger | G01C 11/00 382/201 |
| 2013/0222385 A1 | 8/2013 | Dorsey et al. | |
| 2013/0249906 A1 | 9/2013 | Gunderson et al. | |
| 2014/0376768 A1 | 12/2014 | Troy et al. | |
| 2016/0267941 A1* | 9/2016 | Carlson | G11B 27/031 |
| 2017/0032574 A1* | 2/2017 | Sugaya | G06T 19/006 |
| 2017/0090716 A1* | 3/2017 | Inomata | G06F 3/0416 |

OTHER PUBLICATIONS

Author unknown, "Appendix D—TIFF Tags", archived from http://www.rastermaster.com:80/RasterMaster DLL manual/WebHelp/Content/aptifftagswide.htm on Mar. 19, 2016, retrieved from https://web.archive.org/web/20160319140200/http://www.rastermaster.com:80/RasterMaster%20DLL%20manual/WebHelp/Content/aptifftagswide.htm.*

Tachibanaya, "Description of Exif file format", archived on Feb. 21, 2001, retrieved from https://web.archive.org/web/20010221091533/https://www.media.mit.edu/pia/Research/deepview/exif.html on Mar. 12, 2019.*

Sukan, Mengu, and Steven Feiner. "SnapAR: Storing snapshots for quick viewpoint switching in hand-held augmented reality." 2010 IEEE International Symposium on Mixed and Augmented Reality. IEEE, 2010.*

Mill, Tarvo, Aivars Alt, and Roode Liias. "Combined 3D building surveying techniques—terrestrial laser scanning (TLS) and total station surveying for BIM data management purposes." Journal of Civil Engineering and Management 19.sup1 (2013): S23-S32.*

* cited by examiner

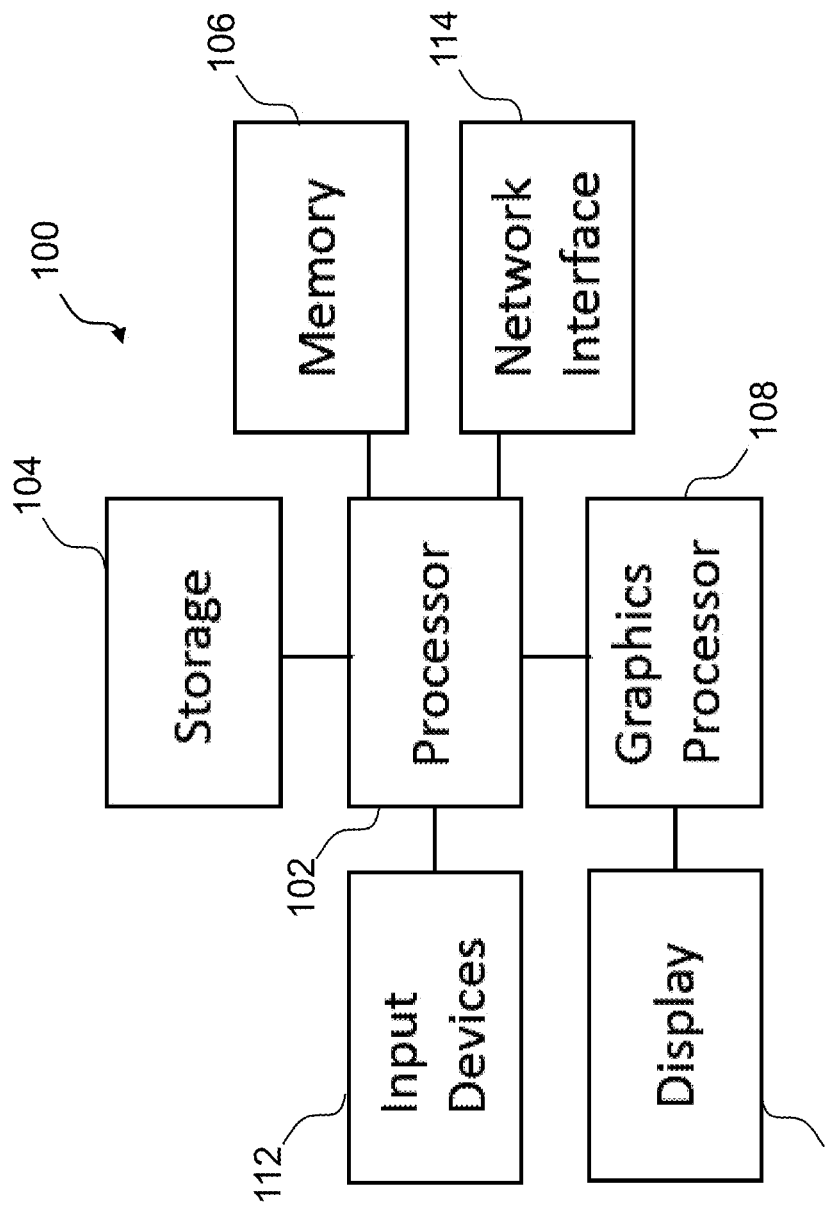

SYNTHETIC GEOTAGGING FOR COMPUTER-GENERATED IMAGES

BACKGROUND

This disclosure generally relates to three-dimensional (3-D) visualization systems. In particular, this disclosure relates to tagging computer-generated images of a 3-D model of an object with metadata representing the location of a virtual camera.

Image files are composed of digital data in one of many image file formats that can be rasterized for use on a computer display or printer. An image file format may store data in uncompressed, compressed, or vector formats. Once rasterized, an image becomes a grid of pixels, each of which has a number of bits to designate its color equal to the color depth of the device displaying it. It has become common practice to include camera location metadata in digital image files.

As used herein, the term "viewpoint" is the apparent distance and direction from which a virtual camera views and records an object. A visualization system allows a user to view an image of an object from a viewpoint that can be characterized as the apparent location of a virtual camera. As used herein, the term "location" includes both position (e.g., x, y, z coordinates) and orientation (e.g., look direction vector or yaw, pitch and roll angles of a virtual line-of-sight).

A 3-D visualization system may be used to display images representing portions and/or individual components of one or more 3-D models of an object within a graphical user interface. Visualization systems may be used to perform various operations with respect to the image of the object. For example, a user may use a visualization system to navigate to an image of a particular part or assembly of parts within the object for the purpose of identifying information for use in performing an inspection. During such navigation, the image observed by the user may be translated, rotated and scaled to reflect user-initiated changes to the location of the virtual camera. In addition, the image can be cropped in response to changes to the field-of-view of the virtual camera.

Navigating in 3-D visualization environments can be difficult and time consuming, often requiring a moderate level of skill and familiarity with the 3-D visualization controls. As one illustrative example, a 3-D visualization system may be used to visualize different types of aircraft being manufactured at a facility and data about these aircraft. More specifically, a 3-D visualization application running on a computer may display a computer-aided design (CAD) model of an aircraft comprising many parts. With some currently available visualization systems, filtering the extensive amount of data available in order to obtain data of interest concerning a particular part may be more difficult and time-consuming than desired. Some 3-D visualization systems require training and experience in order for the user to easily navigate through the CAD model of the aircraft. In particular, an interested user may find it difficult to remember or re-create a particular viewpoint of a CAD model of an aircraft (or other vehicle) to be displayed on a display screen.

It is often the case in working with computer graphics applications that viewpoints need to be saved and then recovered at a later date or by other people. Images of a specific scene may be stored by the user, but if a separate file containing the location data for the virtual camera is not saved at the same time, it can be difficult to return to the exact viewpoint in the 3-D environment where the image was generated. There are several types of existing applications that address the viewpoint recovery problem. Some existing 3-D visualization solutions use named virtual camera locations or have separate or proprietary approaches to recalling predefined viewpoints. The most common approaches involve storing a separate viewpoint file or integrate a thumbnail image into a custom session file. These approaches result in additional complexity (multiple files that have to be managed) and/or reduced flexibility (not able to view images and data in standard viewers).

In addition, determining the viewpoint location offset from a set of computer-generated images is often required for subsequent analysis or motion planning purposes, and can be difficult to determine by using the images alone.

It would be desirable to provide a process for adding virtual camera location data to computer-generated images, which location data could be used later to return to the viewpoint in the 3-D environment where the image was generated. It would also be desirable to provide a process for determining the relative offset between such computer-generated images.

SUMMARY

The subject matter disclosed in detail below is directed to systems and methods for constructing and saving files containing computer-generated image data with associated virtual camera location data during 3-D visualization of an object (e.g., an aircraft). The process disclosed herein simulates the digital photography "geotagging" process, which normally uses GPS-based location data, but instead tags computer-generated images with virtual camera location and settings information selected by the user while navigating a 3-D visualization of an object. The virtual camera location data in the saved image file can be used later as a way to return the viewpoint to the virtual camera location in the 3-D environment from where the image was taken. For example, these tagged images can later be drag-and-dropped onto the display screen while the 3-D visualization application is running to activate the process of retrieving and displaying a previously selected image. In accordance with a further enhancement, multiple images can be used with this method to determine the relative viewpoint offset between images.

The methods for adding virtual camera location data to computer-generated images disclosed in detail below address the need for an intuitive way to store and recover virtual camera location (i.e., viewpoint) data for computer-generated images, as well as determining the location offsets between multiple images. This solution automatically saves the virtual camera location and settings (e.g., field-of-view) data into metadata fields of an image file, which relieves the user from having to perform separate steps to store the virtual camera location and settings data. In addition to being able to read the image file into a 3-D visualization application, images can be viewed in any image viewer, and the virtual camera location and settings data can be extracted by the image viewer (if it is capable of reading image metadata).

For a project in which multiple engineers are working with 3-D models for the design of an object such as an aircraft, a first engineer may want to communicate a problem to one or more other engineers about something that needs their attention. The first engineer can move the viewpoint around in the 3-D virtual environment to the desired location, save an image of the scene (with virtual camera location data embedded in the image), and then send that image to other engineers (through e-mail or other electronic form). The other engineers can then open the image to view it. For some situations, just manually viewing the image might be enough, but if they need to investigate the parts in the 3-D environment, they can drag-n-drop the image onto their own 3-D visualization application (one that is setup to read the virtual camera location data from the image), and then the viewpoint in the 3-D scene changes to show the 3-D view that the first engineer had in his application when he created the image.

In accordance with a further enhancement, a user may create a series of two or more images and provide those images to other users to inspect using an application capable of loading image metadata. After loading the metadata, the application can then perform an analysis to determine the relative offset between the images.

One aspect of the subject matter disclosed in more detail below is a method for three-dimensional visualization comprising: opening a three-dimensional visualization application; selecting a three-dimensional model of an object; displaying a default image of at least a first portion of the object using the three-dimensional visualization application to process three-dimensional model data of the selected three-dimensional model, the default image having a default viewpoint; navigating from the default viewpoint to a first viewpoint of interest using the three-dimensional visualization application to process the three-dimensional model data; selecting a first image of a second portion of the object for storage in a nontransitory tangible computer-readable storage medium; constructing a first digital image file containing first image data corresponding to the first image and first metadata comprising data representing a first location of a virtual camera that captured the first image with the first viewpoint of interest; and storing the first digital image file in the nontransitory tangible computer-readable storage medium.

This method may further comprise: retrieving the first digital image file from the nontransitory tangible computer-readable storage medium; extracting the first metadata from the first digital image file; and re-creating and displaying the first image of the second portion of the object using the three-dimensional visualization application to process three-dimensional model data, the re-created first image having the first viewpoint of interest.

In the alternative, this method may further comprise: navigating from the first viewpoint of interest to a second viewpoint of interest different than the first viewpoint of interest using the three-dimensional visualization application to process the three-dimensional model data; selecting a second image of a third portion of the object for storage in the nontransitory tangible computer-readable storage medium; constructing a second digital image file containing second image data corresponding to the second image and second metadata comprising data representing a second location of the virtual camera that captured the second image with the second viewpoint of interest; and storing the second digital image file in the nontransitory tangible computer-readable storage medium.

In accordance with some embodiments of the foregoing method, the metadata is stored in Exchangeable Image File Format. Preferably each of the first and second metadata comprise x, y and z coordinates of the virtual camera in a frame of reference of the object and a look direction of the virtual camera. In addition, the metadata may further comprise a field-of-view of the virtual camera.

In accordance with a further enhancement, the method further comprises computing a position and orientation representation of a relative offset between the first and second viewpoints of interest. Optionally the first and second images with respective first and second viewpoints can be displayed in sequence.

Another aspect of the subject matter disclosed in detail below is a system for three-dimensional visualization comprising a nontransitory tangible computer-readable storage medium, a display device and a computer system, wherein the computer system is configured to perform the following operations: (a) controlling the display device to display a default image of at least a first portion of the object using the three-dimensional visualization application to process three-dimensional model data representing the object, the default image having a default viewpoint; (b) controlling the display device to change the default viewpoint using the three-dimensional visualization application to process three-dimensional model data, the viewpoint being changed until a first image of a second portion of the object having a first viewpoint of interest different than the default viewpoint is displayed; (c) constructing a first digital image file containing first image data corresponding to the first image and first metadata comprising data representing a first location of a virtual camera that captured the first image with the first viewpoint of interest; and (d) storing the first digital image file in the nontransitory tangible computer-readable storage medium.

The computer system may be further configured to perform the following operations: (e) controlling the display device to change the first viewpoint of interest using the three-dimensional visualization application to process three-dimensional model data, the viewpoint being changed until a second image of a third portion of the object having a second viewpoint of interest different than the first viewpoint of interest is displayed; (f) constructing a second digital image file containing second image data corresponding to the second image and second metadata comprising data representing a second location of a virtual camera that captured the second image with the second viewpoint of interest; (g) storing the second digital image file in the nontransitory tangible computer-readable storage medium; and (h) computing a position and orientation representation of a relative offset between the first and second viewpoints of interest in response to a user input. The process of computing the position and orientation offset can be performed by applications other than the 3-D visualization application.

A further aspect is a method for three-dimensional visualization comprising: displaying a first image having a first viewpoint of interest using a three-dimensional visualization application to process three-dimensional model data of a three-dimensional model of an object; selecting the first image for storage in a nontransitory tangible computer-readable storage medium; constructing a first digital image file containing first image data corresponding to the first image and first metadata comprising data representing a first location of a virtual camera that captured the first image with the first viewpoint of interest; and storing the first digital image file in the nontransitory tangible computer-readable storage medium.

The method described in the preceding paragraph may further comprise: navigating from the first viewpoint of interest to a second viewpoint of interest different than the first viewpoint of interest using the three-dimensional visualization application to process the three-dimensional model data; selecting the second image for storage in the nontransitory tangible computer-readable storage medium; constructing a second digital image file containing second image data corresponding to the second image and second metadata comprising data representing a second location of the virtual camera that captured the second image with the second viewpoint of interest; storing the second digital image file in the nontransitory tangible computer-readable storage medium; and computing a position and orientation representation of a relative offset between the first and second viewpoints of interest.

Other aspects of systems and methods for constructing and saving files containing computer-generated images with associated virtual camera location data during 3-D visualization are disclosed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 5 is a block diagram identifying components of a computer system suitable for executing the automated data processing functions disclosed herein.

Reference will hereinafter be made to the drawings in which similar elements in different drawings bear the same reference numerals.

DETAILED DESCRIPTION

Figure 1:
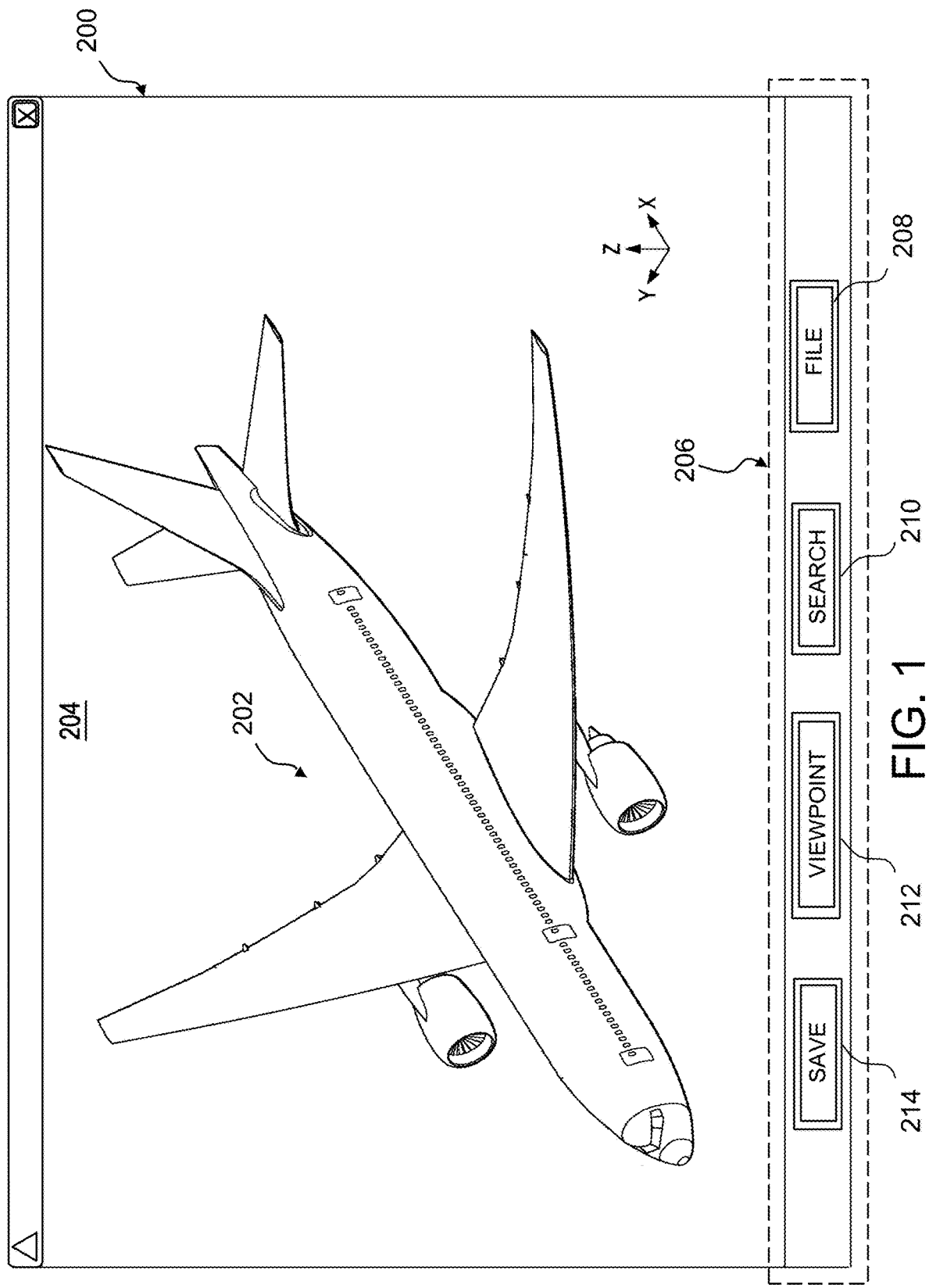
FIG. 1 is a diagram representing a graphical user interface in which a computer-generated image of a 3-D model of an aircraft is being displayed. Although such images are typically in color, the image in FIG. 1 has been drawn using black lines only (i.e., without shading).

Illustrative embodiments of systems and methods for adding virtual camera location data (and optionally also virtual camera settings data) to computer-generated images are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, systems and methods for adding virtual camera location data to files containing image data captured during 3-D visualization of an aircraft or parts thereof will be described in detail below. However, the concept disclosed herein can also be used to tag images generated during 3-D visualization of structures other than aircraft. More specifically, the systems and methods disclosed herein have potential for use within the aerospace industry, as well as in other fields involving manufacturing, architectural, construction, education, and entertainment applications that use 3-D models.

The process described here is independent of the 3-D visualization software, and could be made compatible with different commercially available 3-D visualization software such as Catia, Solidworks, NX, Inventor, Maya, 3DS Max, Blender, etc.

Geo-located digital photographs contain location data that is stored within the metadata section of the digital image file, usually in the Exchangeable Image File Format (EXIF). The Exchangeable Image File Format is a standard means of tagging images with metadata representing information about the image. The image file format may be anyone of the commercially available image file formats that supports EXIF (such as JPEG and TIFF file formats). The process of associating an image with location data within the digital photograph is commonly referred to as "geotagging". This existing storage method is leveraged herein for computer-generated images and is extended to cover offset processing of multiple images.

For a selected image, the process described herein adds virtual camera location data in the Exchangeable Image File Format (or some other customized image metadata file format) to the image file containing the image data. This enables a localization capability for computer-generated images that simulates the geotagging process for digital photographs by substituting computed virtual camera position coordinates for GPS (i.e., latitude and longitude) data. The method also allows the orientation and settings of the virtual camera to be added as metadata to the digital image file.

After the computer-generated image is rendered in the 3-D environment, the Cartesian coordinate (x,y,z) data can be stored in the existing latitude, longitude and altitude fields of the Exchangeable Image File Format, and the rotation about the vertical axis (yaw) can be recorded in the heading field. Alternatively, the transformation matrix or other position (x,y,z) and orientation (roll, pitch, yaw) representation can be recorded in other customized fields within the EXIF metadata structure. Field-of-view (FOV) data can be recorded as well.

Optionally, other data, such as the directory path 3-D model data could also be stored in the image metadata section. Further data can be stored in the image metadata section, which may include additional session file information associated with the state of the virtual environment for the computer-generated image. The optional session information associated with the state of the virtual environment may include names of the 3-D models loaded in the virtual environment, the state of objects within the models, such as being on or off (shown or not shown), the object color and/or material, layer states, lighting characteristics, level-of-detail settings, and other settings associated with control of the rendering of the 3-D scene. The various session settings of the virtual environment enable re-creating the actual scene of the computer-generated image to which the metadata is associated, such as when particular parts, or layers, or models are not shown in order to view internal features or parts, e.g. internal avionics, hidden landing gears components, or the like. As previously noted, storage of this additional state information in the image metadata (by the person or process generating the image) is optional. Likewise using this additional information (by the consumer of the data) is optional. In addition, these additional elements can be optionally selected to be included by the creator of the image or used (or not used) by the consumer of the image. This may be by menu-based options selection or interaction with a pop-up dialog box when the user drops the image into the 3-D visualization application. Also, there may be security concerns associated with including information about the models in the image metadata. In those situations, the sensitive data may be encrypted.

In order to fully realize the embodiments which use the EXIF format, a variety of data need to be written into a file in accordance with the EXIF standard, which is currently at version 2.3. This data can be divided into several categories, including image (picture) data, tags that relate to or describe the image, tags that relate to the devices (typically but not exclusively information about cameras, lenses and light sources) used to acquire the image, and tags that describe the location and orientation where the image was acquired. A "tag" (also known as an "attribute") typically comprises a combination of a textual name, a numeric ID code, and a value or a set of values of specified size. Examples of tags that relate to the image data include 'ImageWidth' and 'ImageHeight', both of which have a single long integer value. Tags can be further categorized in a few other ways. Some are mandatory, others are optional. Some tags are also defined as part of the EXIF standard and can therefore be considered "public", as their names, value types, and uses are already agreed on; these public tags have unique textual names and numeric ID codes. Other tags can be defined by their implementer independent of the EXIF standard and are considered private, as their names, ID codes, values, and uses may be known only to the implementer. However, the EXIF standard provides mechanisms that allow and support the existence of these private extensions. A related set of tags is grouped into a collection known as an "IFD", which stands for "Image File Directory". As with tags, some IFDs are mandatory, public and predefined; others are optional and/or private. The current standard supports the existence of private IFDs.

With the above information as background, one can proceed to discuss the details of what data needs to be written into which fields for the embodiments disclosed herein. To begin with, there are a wide variety of existing implementations that all write both the image data and the tags that are associated with the image data. Some implementation of these capabilities are needed for the embodiments disclosed herein but are not sufficient to record all of the required data. Such fields will not be discussed further herein.

The most relevant existing EXIF tags/values that need to be written are listed below. These all exist in the GPS Info IFD.

The "GPSVersionID" tag in the primary image IFD is mandatory to indicate that other location information tags are also present in the GPS Info IFD. The value this tag must contain is the version of the EXIF standard current at the time; currently this is "2.3.0.0".

The "GPSTimeStamp" tag value indicates the time of image acquisition. It is expressed as three integer values giving the hour, minute and second.

The "GPSSatellites" tag value shall be set to null, indicating that no measurement-capable satellite receiver was used.

The "GPSMeasureMode" tag value shall be set to the null-terminated ASCII string "3" to indicate a three-dimensional measurement.

The "GPSImgDirectionRef" tag value shall be set to the null-terminated ASCII string "T" to indicate true direction (as opposed to magnetic).

The "GPSImgDirection" tag value shall be set to the yaw value of the virtual camera in the 3-D rendering application.

The "GPSProcessingMethod" tag value shall be set to the character string "IVT" to indicate the name of the method used for location finding.

The "GPSDateStamp" tag value shall be set to the year, month, day when the image was acquired. The format is "YYYY:MM:DD", null-terminated.

Some of the data that should be recorded is not recorded in any existing public or documented private tag. In accordance with the embodiments disclosed herein, the specific values to be recorded are the Cartesian (x, y, z) position and the roll, pitch, yaw orientation of the virtual camera. In some embodiments, the metadata includes other session state information such as state of the models and state of the environment to re-create the actual virtual image captured from the 3-D visualization. It is possible to retask some of the existing fields in the GPS Info IFD to record this. The GPSLatitude and GPSLongitude fields each hold a triple of values, so they are, at least at first glance, possible candidates. However the value validation constraints that would reasonably be applied to the expected values in these fields mean that the data of interest would be flagged as violations, possibly leading to unexpected and possibly erroneous behavior on the part of other software typically used to process images that contain these fields. It is also possible to define private tags in an existing IFD but that runs the risk of an unintentional clash with other private tags that have also coincidentally chosen the same numeric IDs. The safest solution is to define a private IFD in a custom Application Marker Segment and then also define a new pair of tags ("3DPosition" and "3DOrientation") in there to hold the data. Each of these tags would be marked as mandatory in this IFD and each would hold a triple of values (of data type RATIONAL as defined in the EXIF standard) for their respective data.

After the image file has been constructed and saved, it can be loaded into (or drag-and-dropped onto) a 3-D visualization application at a later time to return the 3-D visualization application to the prior viewpoint used to initially generate the image. In some cases, the particular model and environment state information (optional) returns the 3-D visualization application to the condition when the image was captured and saved in the image file. The concept is similar to a bookmark, but is easier to use than a text-based bookmark, since it allows visual identification. During the loading process, the image (pixel) information can be ignored by the 3-D visualization application and only the EXIF data is loaded, after which the location information is extracted and then used to set the virtual camera location (i.e., the viewpoint) and previous session characteristics in the 3-D environment.

A 3-D visualization application may be run on many different types of computer systems. As used in the claims, the term "computer system" should be construed broadly to encompass a digital data processing system having at least one computer or processor, and which may have multiple computers or processors that communicate through a network or bus or directly to each other. As used in the preceding sentence, the terms "computer" and "processor" both refer to devices comprising a processing unit (e.g., a central processing unit, an integrated circuit or an arithmetic logic unit). Examples of suitable computer systems include a smartphone, a tablet computer, a laptop computer, a desktop computer, a workstation computer, a smart watch, a head-mounted display or other wearable displays. The computer system may include at least two processors connected to each other, one of which is a graphics processor. In the alternative, it is common for high-end systems to have a central processing unit (CPU) as well as a graphics processing unit (GPU), but some systems, like lower-end computing systems or smartphones, may have a single processor with an embedded graphics processing chip (often referred to as "integrated" graphics), or even "software" rendering, which uses the CPU to render the images.

In accordance with some embodiments, the computer system comprises a graphics processor configured to perform the graphics function known as rendering. As used here, the term "rendering" is the process of generating an image from a 2-D or 3-D model by means of computer programs. The graphics processor described herein renders at least a portion of the 3-D model of a selected object in a window with a default or other existing viewpoint during running of a 3-D visualization application. In response to the input of a 3-D visualization activation command from the user, a separate processor that processes user inputs retrieves 3-D model data from a nontransitory tangible computer-readable storage medium and sends it to the graphics processor for rendering, i.e., the 3-D model data is processed and output to a digital image or raster graphics image file for display on a display device.

The graphics processor is configured to render for display a digital 3-D model of a structural product composed of a plurality of parts, such as a 3-D computer-aided design (CAD) or other similar 3-D model (sometimes referred to as a solid model). The graphics processor may render the digital 3-D model in accordance with a number of techniques, such as those employed by CAD viewers and other 3-D visualization applications. These types of applications use a graphics application program interface (API), such as OpenGL or Direct3D, to render sequences of images representing views of the 3-D models contained within a virtual environment. Some examples include virtual reality modeling language (VRML) viewers, X3D viewers, Java 3D viewers, QuickTime virtual reality (VR), QTVR, Unity, Unreal Engine or the like.

In one example, the 3-D model may represent the structural product as a collection of "primitives" such as edges, faces, points (e.g., vertices) and the like, which may be arranged into polygons or other arithmetically-derived structures to represent the geometry of surfaces, volumes or parts of the respective structural product. The structural product may be defined by a "boundary" representation, or collection of polygons that demarcate the space occupied by the structural product, which may include sub-collections of polygons that demarcate spaces occupied by respective parts of the structural product. Each of these sub-collections of polygons may be referred to as a 3-D object that corresponds to part of the structural product in the 3-D model. For some structural products, the 3-D model may use hundreds of thousands, millions or even billions of polygons, which may be arranged in thousands of sub-collections of polygons (3-D objects) corresponding to several thousands of parts.

The 3-D model may include information that may indicate a design type of the aircraft model, such as an art concept, preliminary design, released design or the like. The 3-D model may include information (e.g., name, number, quantity, source, material, 3-D location, related parts) regarding the structural product and/or one or more of its parts. The 3-D model may further include a model-based definition of the structural product, product manufacturing information such as geometric dimensions and tolerances, material specifications, component lists, process specifications, inspection requirements or the like. Additionally or alternatively, for example, the 3-D model may include information specifying various manufacturing, inspection, maintenance and/or repair procedures, each of which may include one or more tasks involving (user) interaction with one or more parts of the structural product. In various examples, this additional information may be provided directly in the 3-D model or in metadata associated with the 3-D model.

The 3-D visualization application is configured to render the digital 3-D model of the structural product in a scene in which the digital 3-D model (or portions thereof) is observed from a particular point of view (i.e., viewpoint) corresponding to a virtual camera location in the frame of reference of the aircraft. The 3-D visualization application may open or otherwise initially render the 3-D model observed from a home (i.e., default) virtual camera location (i.e., home viewpoint), such as a viewpoint in which the whole of the structural product is observed.

FIG. 1 is a diagram representing a graphical user interface 200 in which a computer-generated image 202 of a 3-D model of an aircraft is being displayed within a window 204. (Although such images are typically in color, the image in FIG. 1 has been drawn using black lines only, i.e., without shading.) Aircraft image 202 may be a root image in this illustrative example.

As depicted in FIG. 1, the graphical user interface 200 may include a control section 206. In accordance with one embodiment, the control section 206 may comprise a File virtual button 208, a Search virtual button 210, a Viewpoint virtual button 212 and a Save virtual button 214.

The File virtual button 208 is configured to enable a user to select a file containing a 3-D model of an aircraft for visualization in window 204. The selection process may employ any conventional technique, such as the appearance of a drop-down menu comprising a listing of the names of accessible 3-D model files. In response to selection of a file, the selected file will be retrieved from a nontransitory tangible computer-readable storage medium. Then a graphics processor renders the 3-D model data in the retrieved file into a scene comprising an image of at least a portion of the selected 3-D model as seen from a home or default viewpoint. In the example depicted in FIG. 1, the airplane image 202 has been displayed in response to the selection of a 3-D model file by the user.

The Search virtual button 210 is configured to cause a pop-up search window (not shown in the drawings) to be displayed in window 204 when the search virtual button 210 is selected (e.g., clicked on using a mouse-controlled cursor). The 3-D visualization application may be configured to allow users to use the pop-up search window to submit a query seeking a selected portion of the 3-D model data corresponding to an aircraft model based on search criteria entered into respective fields in the pop-up window. The search criteria may include, for example, without limitation, at least one of a location with respect to a reference coordinate system of the selected aircraft model, an aircraft model identifier, a part number, an instance number, or some other type of search criterion.

Figure 2:
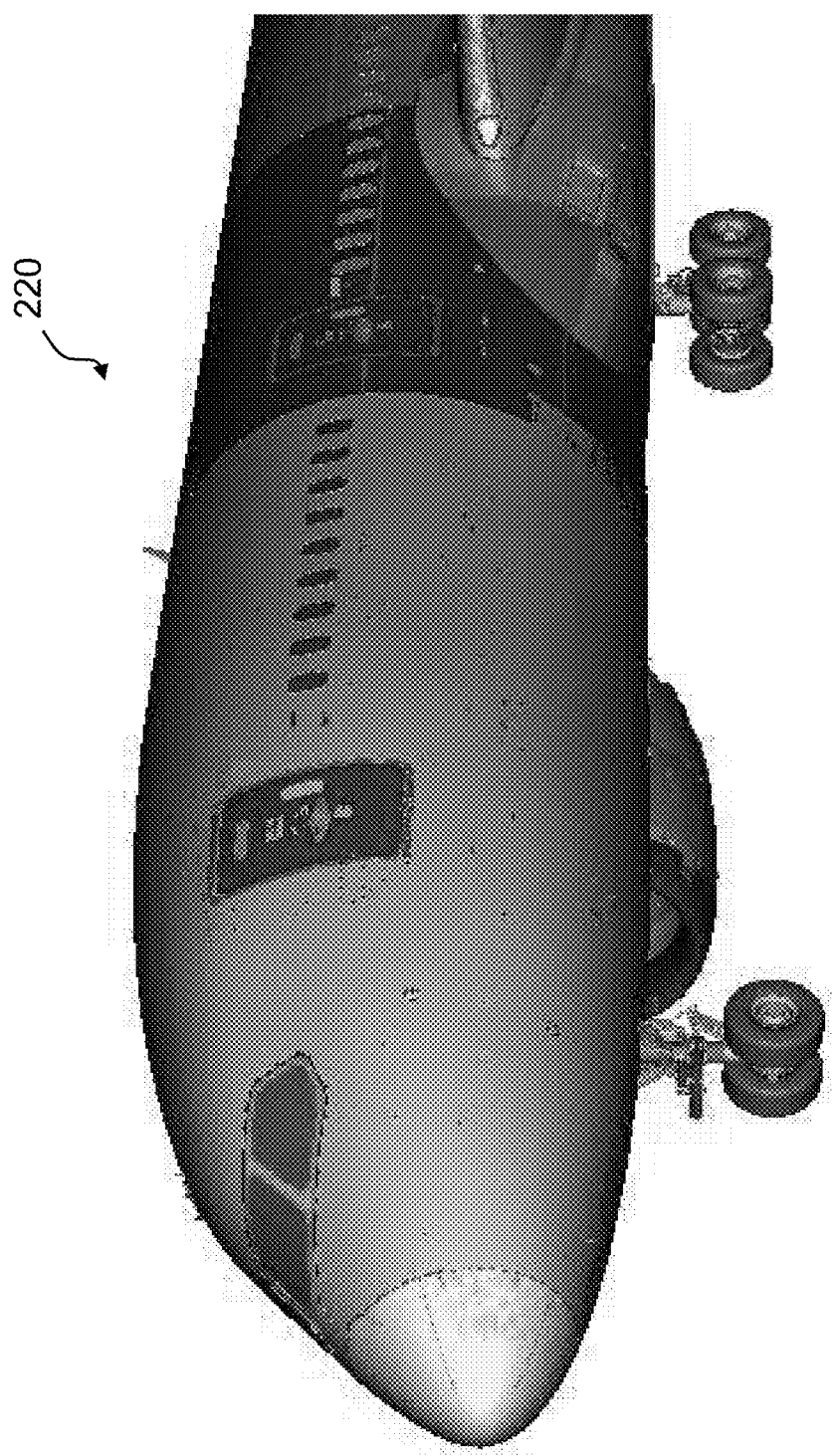
FIG. 2 is a computer-generated image of a 3-D model of the front end of an aircraft. Although such images are typically in color, the image in FIG. 2 has been drawn using gray shading instead.

The 3-D visualization application that produces the scene depicted in FIG. 1 may also receive user input (e.g., by controlling the movement of a cursor or other pointer using a mouse or other input device) to navigate the 3-D model through a number of different operations such as pan, tilt and/or zoom operations, which may move the viewpoint for visualizing the 3-D model from one location (e.g., its home viewpoint) to another location. In this manner, the scene may be focused on a particular portion of the 3-D model of the aircraft. For example, FIG. 2 is a computer-generated (i.e., rendered) image 220 of a portion of a 3-D model that represents the front end of an aircraft. This image 220 (seen in FIG. 2) may be displayed in window 204 (seen in FIG. 1) in place of aircraft image 202. As previously noted, such images are typically in color. The image 220 in FIG. 2 has been drawn using gray shading instead.

More generally, the 3-D visualization application is configured to display a scene showing a portion of the 3-D model of the aircraft, which scene is being viewed from the vantage point of a virtual camera located as specified by the current viewpoint setting. The current viewpoint setting is constantly being computed as the viewpoint changes in response to user actions. The current viewpoint setting can be displayed by clicking on the Viewpoint virtual button 212 (see FIG. 1).

Figure 3:
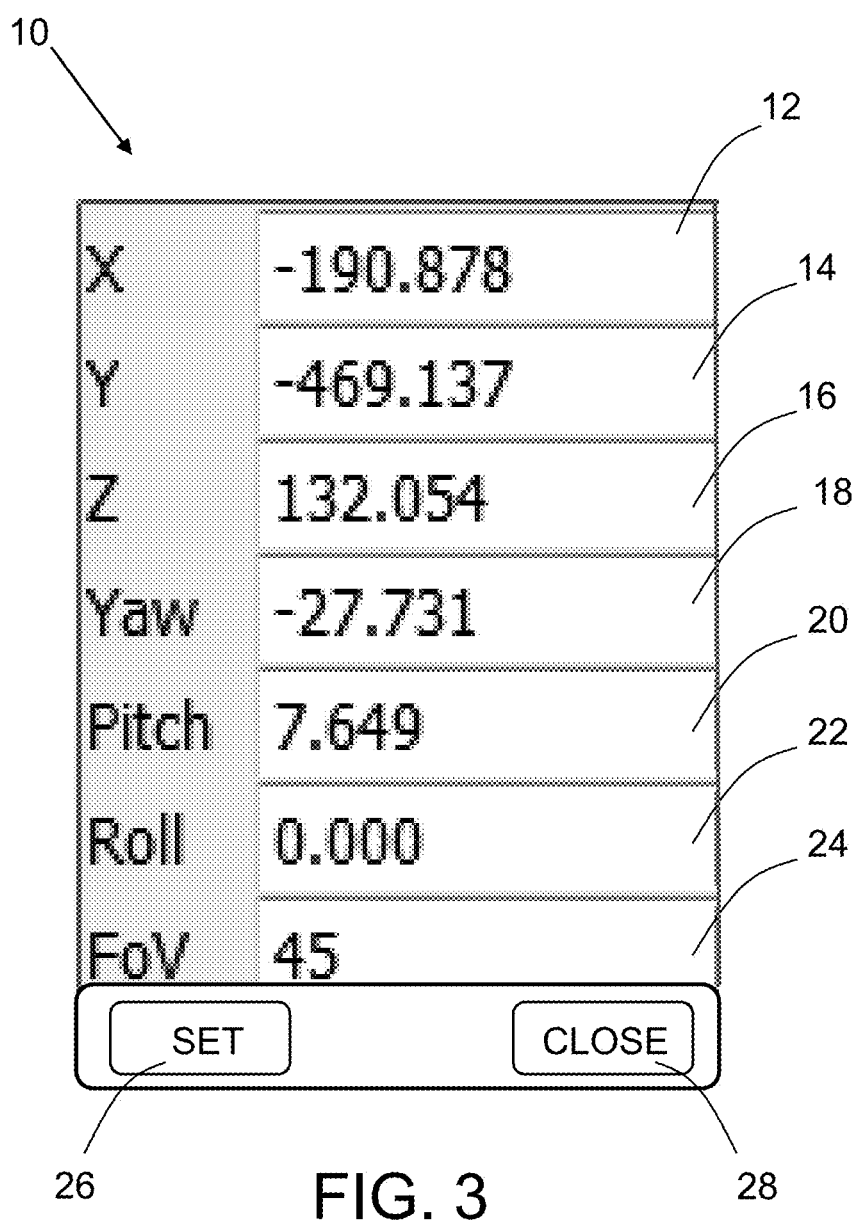
FIG. 3 is a diagram representing a dialog box comprising a list of values representing the viewpoint of a computer-generated image being concurrently displayed.

The Viewpoint virtual button 212 is configured to cause a dialog box to be displayed in window 204 when the Viewpoint virtual button 212 is selected. FIG. 3 is a diagram representing such a dialog box 10. In accordance with one implementation, the dialog box 10 comprises a column of fields containing a list of values representing the current viewpoint of the computer-generated image (i.e., the location of a virtual camera that virtually captured the image) presented in FIG. 2. For example, if the image 220 seen in FIG. 2 is being displayed in window 204 (seen in FIG. 1) instead of the aircraft image 202, then when the user clicks on the Viewpoint virtual button 212, the dialog box 10 seen in FIG. 3 will appear with data representing the viewpoint used to present the image 220. More specifically, the column of fields in dialog box 10 contain information regarding the location and field-of-view of the virtual camera. In this example, the dialog box 10 comprises the following fields populated by specific exemplary parameter values: a field 12 populated by an X coordinate of the position of the virtual camera in the coordinate frame of reference of the aircraft (hereinafter "virtual camera position"); a field 14 populated by a Y coordinate of the virtual camera position; a field 16 populated by a Z coordinate of the virtual camera position; a field 18 populated by a yaw angle of the orientation of the line-of-sight of the virtual camera (hereinafter "look direction") relative to an axis of the aircraft; a field 20 populated by a pitch angle of the look direction; a field 22 populated by a roll angle of the look direction; and a field 24 populated by a field-of-view of the virtual camera. After the user has finished reviewing the information listed in the dialog box 10, the user can close the dialog box (i.e., cause the dialog box 10 to disappear from the window 204) by clicking on the Close virtual button 28.

In addition, the dialog box 10 can be used to set a new viewpoint by typing different numbers into the respective fields and then clicking on the Set virtual button 26. In response to the user setting the viewpoint, the 3-D visualization application will generate a new image captured by a virtual camera having the new viewpoint. The dialog box 10 shows one of the ways that the viewpoint position (x, y and z coordinates) and look direction (yaw, pitch and roll angles) can be set. In other places in the 3-D visualization application, a vector representation can be used directly. The 3-D visualization application can convert back and forth between the different forms, but in the end the viewpoint information will be converted into a 4×4 transformation matrix that is sent to the graphics processor.

The yaw, pitch and roll values are orthogonal rotations that allow users to set the look direction relative to the home or default direction, which in the specific application disclosed herein is looking down the x-axis. The yaw, pitch and roll angles are converted into a 3×3 rotational matrix and then multiplied by a unit vector defined in the x-direction, i.e., X=[1,0,0]. This 3×3 rotation matrix times x-direction unit vector calculation produces the look direction vector.

In accordance with one possible embodiment, the dialog box 10 can use this yaw, pitch, roll form because it is sometimes easier for users of 3-D applications to set a look direction this way instead of specifying the look vector directly. However, it should be appreciated that the dialog box 10 in FIG. 3 is optional. It can be opened up by the user at any time and will continuously update itself as the user moves the viewpoint using a mouse, gamepad, or other user input device or mechanism. It is expected that usually a user would not have the dialog box 10 open. It was included in FIG. 3 for reference to show what type of values may be put into the EXIF-formatted metadata that will be included in the image file. It is not necessary to show current viewpoint data while the user is moving around in the virtual environment, since most users probably would not need (or want) to know the actual viewpoint numbers. The process disclosed hereinafter enables users to avoid dealing with the viewpoint values directly.

Referring again to FIG. 1, the Save virtual button 214 is configured to cause the image currently being displayed in window 204 to be saved along with metadata representing the location of the virtual camera corresponding to the viewpoint of the image. As previously disclosed, the 3-D visualization application that produces the scene depicted in FIG. 1 may receive user input (e.g., by controlling the movement of a cursor or other pointer using a mouse or other input device) to navigate the 3-D model through a number of different operations such as pan, tilt and/or zoom operations, which may move the viewpoint for visualizing the 3-D model from one location to another location. The viewpoint may be changed continuously, for example, by continuously moving a mouse to control a cursor that is superimposed on the 3-D visualization. As disclosed below with reference to FIG. 5, a processor receives these user inputs and continually updates the viewpoint 30 to 60 times per second, computing the viewpoint transformation matrix and sending it to a graphics processor to render the updated image on a display screen. At any point during navigation, the user has the option of stopping further cursor movement and saving the current image plus viewpoint metadata to storage by clicking on the Save virtual button 214 (see FIG. 1). More specifically, the viewpoint data is arranged in EXIF or other suitable format and then added to a digital image file along with the image data of the current image being displayed. Each such image file is typically referred to as a frame. Successive frames can be stored in a nontransitory tangible computer-readable storage medium for later retrieval. For example, the image data in a multiplicity of such image files may be displayed in sequence to provide an animation on the display screen.

Figure 4:
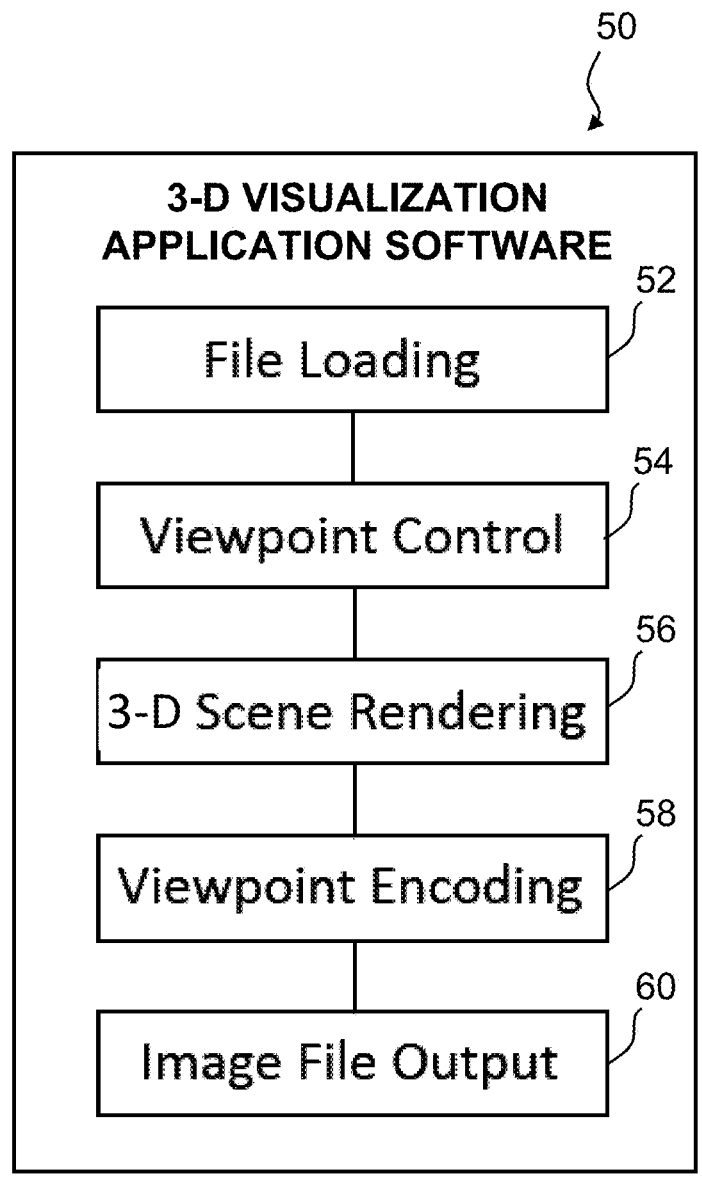
FIG. 4 is a block diagram identifying software modules that are incorporated in the 3-D visualization application software employed in the embodiments disclosed herein.

FIG. 4 is a block diagram identifying software modules that are incorporated in the 3-D visualization application software 50 employed in the embodiments disclosed herein. The file loading software module 52 is configured to load a file into the application. This may include loading of files containing data representing a 3-D model of an object from a storage medium to working memory in response to selection of a 3-D model by the user. Other types of files, including files with viewpoint data (including the data from image files that contain location metadata), may be loaded by module 52.

The navigation control software module 54 is configured to compute the location of a virtual camera in the frame of reference of the object for the image being currently displayed. The file loading and navigation control software modules may be running on a main processor which communicates with a graphics processor. When the computer system comprises a separate graphics processor, the navigation control software module 54 is further configured to cause the main processor to send the virtual camera location data to the graphics processor in the form of a transformation matrix.

The 3-D visualization application software 50 further comprises a 3-D scene rendering software module 56 which comprises instructions for performing scene rendering operations to be executed by the graphics processor. The 3-D scene rendering software module 56 is configured to generate an image of a selected portion of the selected 3-D model having a viewpoint as specified by the virtual camera location data received from the main processor.

The 3-D visualization application software 50 further comprises a viewpoint encoding software module 58 which is configured to enable the main processor to construct a digital image file comprising image data (e.g., pixel data) and metadata (e.g., virtual camera location data) for the scene being currently displayed in response to a Save instruction input by a user. Optionally, the metadata added to the image file may further comprise virtual camera settings data, such as field-of-view data representing the field-of-view of the virtual camera. In accordance with some embodiments, the metadata is arranged in accordance with the Exchangeable Image File Format.

Still referring to FIG. 4, the 3-D visualization application software 50 further comprises an image file output software module 60 which is configured to enable the main processor to generate and send the image file to storage.

After the image file has been stored, it can later be loaded by various methods, such as being drag-and-dropped onto the display screen while the 3-D visualization application is running to activate the process of retrieving and displaying the previously selected image. The location data from the image file can also be loaded by other methods, by standard file input controls.

In accordance with a further enhancement, multiple images can be loaded and then used to determine the relative viewpoint offset between images. This capability can be used in camera motion planning or robotic applications.

For saving the images and associated metadata, this can be part of the existing image saving process (enabled by an option to include or exclude the EXIF data). For example, while a 3-D visualization application is running, the computer-generated images can be saved by accessing an image save function from a main file menu. Other options are to have a dedicated virtual button on the application toolbar (e.g., the Save virtual button 214 seen in FIG. 1), or a physical button on the keyboard or gamepad, or any of the many other ways that application event actions can be generated.

For the case of automatically saving images, such as when making an animation, if the option to include viewpoint data in the EXIF section of the image file is enabled, then the viewpoint data would be included in the image files without any additional user actions.

During the process of loading an image file in order to restore a previous viewpoint of a portion of a 3-D model of an object, the image (pixel) information can be ignored and only the EXIF data is retrieved. The virtual camera location information contained in the EXIF data is extracted. This relative location data, which is defined in the coordinate system of the airplane (or other object), is used by the 3-D visualization application to set position and orientation of a virtual camera, along with the camera's field-of-view setting from the EXIF data. This combination of computed viewpoint and 3-D models displayed in the virtual environment produces a virtual camera location of where the image was captured defined in terms of the airplane coordinate system. If originally stored in the file, the metadata associated with the state of the models and state of the environment may be used to re-create the actual image of the saved image file, such as by not showing particular models, setting particular lighting effects, or the like.

At the lowest level in the 3-D graphics processing, the camera viewpoint may be represented as a 4×4 homogeneous transformation matrix. The virtual camera location and settings data string that was extracted from the EXIF data is converted by the main processor to the matrix form by internal functions within the 3-D application. In accordance with one implementation, the virtual camera location metadata comprises the x, y, z coordinate position of the virtual camera in the Cartesian space defined in the 3-D virtual environment, the look direction vector that defines the direction in which the camera is pointed, and an up vector which is a vector that is orthogonal to the look direction vector (used to define the twist along look direction). All of the foregoing variables are used to define the camera location.

FIG. 5 is a block diagram identifying components of a system 100 suitable for executing the automated data processing functions disclosed herein. The processor 102 is generally any piece of computer hardware that is capable of executing computer programs that process data (e.g., a 3-D visualization application). The processor 102 may comprise electronic circuits, some of which may be packaged as an integrated circuit (e.g., a chip) or multiple interconnected integrated circuits. The processor 102 may be configured to execute computer programs, which may be stored onboard the processor or otherwise stored in a memory 106 as computer-readable program code. In alternative embodiments, the processor 102 may be embodied as or otherwise include one or more application-specific integrated circuits, field-programmable gate arrays or the like.

The storage 104 is generally any piece of hardware that is capable of storing digital data and computer programs (e.g., computer-readable program code and 3-D model files) on a permanent basis. Such storage may take the form of a hard drive, a solid-state drive, an optical disk, a magnetic tape or some combination thereof.

The memory 106 is generally any piece of computer hardware that is capable of storing digital data and computer programs (e.g., computer-readable program code and a 3-D model file) on a temporary basis. The memory 106 may include volatile and non-volatile memory, and may be fixed or removable. Examples of suitable memory include random access memory, read-only memory, a hard drive, a flash memory, a thumb drive, SD card, a removable computer diskette, an optical disk, or some combination thereof.

In various instances, the storage 104 and the memory 106 may be referred to as a tangible computer-readable storage medium. A tangible computer-readable storage medium is a non-transitory device capable of storing information, and is distinguishable from computer-readable transmission media such as electronic transitory signals capable of carrying information from one location to another.

The system 100 further comprises one or more input devices 112. The input devices 112 may be wired or wireless, and may be configured to receive information from a user into the apparatus, such as for processing, storage and/or display. Examples of suitable user input devices include a mouse, microphone, image or video capture device, keyboard or keypad, joystick, touch-sensitive surface (separate from or integrated into a touchscreen), biometric sensor or the like.

In response to the input of a 3-D visualization activation command from the user via input devices 112, the processor 102 retrieves a file containing 3-D model data from the storage 104 and stores it temporarily in the memory 106. The processor 102 selectively processes the 3-D model data stored in memory 106 in accordance with other user inputs received via the input devices 112 and in accordance with instructions read from the 3-D visualization application software stored in memory 106.

In accordance with one implementation, the 3-D visualization application uses a graphics programming environment (like openGL) to instruct the processor 102 to load a 3-D model from storage 104. Sometimes the 3-D model data goes into the memory 106 and then is loaded into graphics memory (not shown) which is associated with or incorporated in the graphics processor 108, and on other occasions it may go directly into the graphics memory. The graphics processor 108 and associated graphics memory may be parts of an integrated graphic processing unit.

In addition to the storage 104 and 106, the processor 102 is connected to a graphics processor 108, which is in turn connected to a display device 110. As previously described, the graphics processor 108 is configured to render for display digital 3-D models of a structural product composed of a plurality of parts and with respective viewpoints in response to receipt of coordinate transformation matrices from the processor 102. More specifically, the graphics processor 108 processes the 3-D model data and outputs pixel data to a digital image or raster graphics image file for display on a display device.

The processor 102 may also be connected to a network interface 114 for transmitting and/or receiving information, such as to and from other apparatus(es), network(s) or the like. The network interface 114 may be configured to transmit and/or receive information by physical (wired) and/or wireless communications links. Examples of suitable communication interfaces include a network interface controller (NIC), wireless NIC or the like.

The display device 110 may be configured to present or otherwise display information to a user. Suitable examples include a liquid crystal display, light-emitting diode display, plasma display panel or the like.

The 3-D visualization application may further include a software module (not shown in FIG. 4) that is configured to enable the processor to compute the relative offset between respective viewpoints of a sequence of location-tagged images. When multiple image files containing image and location data for successively generated images are available, the processor 102 can compute the relative offset between the respective viewpoints of images selected by the user. In an alternative embodiment, the computation of relative offsets can be done in a separate stand-alone application or image viewer. This capability to determine the relative viewpoint offsets of hundreds of images can be used in camera motion planning or robotic applications.

The relative offset between two viewpoints can be computed using a standard matrix transformation process wherein the viewpoint matrix from one image is inverted and pre-multiplies the viewpoint matrix of the other image, as shown below:

$$_2^1T = {_1^0T}^{-1} {_2^0T}$$

where and $_1^0T$ and $_2^0T$ are the transformation matrices for the respective viewpoints of the computer-generated images (which matrices contain the location information that can be embedded in the EXIF metadata contained in the respective image files), and $_2^1T$ is the resulting offset matrix, which represents the transformation of coordinate frame 2 relative to coordinate frame 1. This image offset calculation feature could be part of a stand-alone application that is independent from the 3-D visualization application. It could also be integrated into an image viewer application. Also note that the offset matrix can be converted into other equivalent forms that describe the position and orientation of the virtual camera location, such as quaternions, Euler parameters, and Euler angles.

Other known applications require either storing the virtual camera location data in a file separate from the image file (making it necessary to keep track of and synchronize the files), or embedding a low-resolution thumbnail image in a customized data file. The method described hereinabove stores the virtual camera location data in the high-resolution image file itself.

The benefits provided by the method described herein include simplified creation of image-based location data, simplified extraction of location data from images, simplified re-creation of a scene shown in a captured image, and simplified storage of data (fewer files to keep track of). This can also lead to improved communication between users, and cost avoidance due to streamlined use of 3-D visualization and image analysis applications.

This type of application could be used in trouble shooting or dispositioning problems for applications like inspection, maintenance, and repair events, where the on-site person creates computer-generated images with a 3-D visualization application that embeds the location data in the images. These images are then sent back to an analyst, who can drag-and-drop them onto a 3-D visualization application to set the correct viewpoint and field-of-view to achieve the same virtual viewpoint that the on-site person used.

The concepts disclosed herein are directly applicable to commercial aircraft manufacturing and service to provide 3-D visualization application users an efficient and easy way save and later retrieve viewpoints of interest in a 3-D environment. It has potential application in 3-D design reviews, as well as in support and services areas such as inspection, maintenance, and repair applications and aircraft configuration.

While methods for saving and later retrieving viewpoints of interest during 3-D visualization have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used herein, the term "location" comprises position in a fixed 3-D coordinate system and orientation relative to that coordinate system.

The process claims set forth hereinafter should not be construed to require that the steps recited therein be performed in alphabetical order (any alphabetical ordering in the claims is used solely for the purpose of referencing previously recited steps) or in the order in which they are recited.

The invention claimed is:

1. A method for adding virtual camera location data to computer-generated images, comprising:

opening a three-dimensional visualization application on a computer system;

retrieving digital data representing a three-dimensional model of an object from a nontransitory tangible computer-readable storage medium;

displaying a computer-generated default image of at least a first portion of the object as pixels on a display device using the three-dimensional visualization application to process the digital data representing the selected three-dimensional model, the computer-generated default image having a default viewpoint;

navigating from the default viewpoint to a first viewpoint of interest using the three-dimensional visualization application to process the digital data representing the selected three-dimensional model until a computer-generated first image of a second portion the object appears on the display device;

selecting the computer-generated first image of the second portion of the object for storage in the nontransitory tangible computer-readable storage medium;

in response to selection of the computer-generated first image, constructing a first digital image file in accordance with the standards of the Exchangeable Image File format, the first digital image file containing, in a part reserved for image data, first digital image data corresponding to the computer-generated first image and containing, in a part reserved for metadata, first and second tags that respectively contain digital data representing a first apparent location of a virtual camera corresponding to the first viewpoint of interest, wherein the first apparent location includes a first position including x, y and z coordinates of the virtual camera in a frame of reference of the object and a first orientation including yaw, pitch and roll angles of a first virtual line-of-sight of the virtual camera in the frame of reference of the object;

after the first digital image file has been constructed, storing the first digital image file in the nontransitory tangible computer-readable storage medium;

retrieving the first digital image file from the nontransitory tangible computer-readable storage medium;

displaying a stored first image based on the first digital image data of the retrieved first digital image file;

placing the stored first image onto a display screen of the three-dimensional visualization application by a drag-and-drop manipulation;

extracting, by the three-dimensional visualization application, the digital data representing the first position and the first orientation of the virtual camera from the first digital image file associated with the stored first image; and re-creating and displaying, by the three-dimensional visualization application, the computer-generated first image of the second portion of the object on the display screen using the three-dimensional visualization application to process three-dimensional model data, the re-created computer-generated first image having the first viewpoint of interest.

2. The method as recited in claim 1, further comprising:

navigating from the first viewpoint of interest to a second viewpoint of interest different than the first viewpoint of interest using the three-dimensional visualization application to process the digital data representing the selected three-dimensional model until a computer-generated second image of a third portion of the object appears on the display device;

selecting the computer-generated second image of the third portion of the object for storage in the nontransitory tangible computer-readable storage medium;

in response to selection of the computer-generated second image, constructing a second digital image file in accordance with the standards of the Exchangeable Image File format, the second digital image file containing, in a part reserved for image data, second digital image data corresponding to the computer-generated second image and containing, in a part reserved for metadata, first and second tags that respectively contain digital data representing a second apparent location of a virtual camera corresponding to the second viewpoint of interest, wherein the second apparent location includes a second position including x, y and z coordinates of the virtual camera in a frame of reference of the object and a second orientation including yaw, pitch and roll angles of a second virtual line-of-sight of the virtual camera in the frame of reference of the object; and after the second digital image file has been constructed, storing the second digital image file in the nontransitory tangible computer-readable storage medium.

3. The method as recited in claim 2, further comprising computing a position and orientation representation of a relative offset between the first and second viewpoints of interest.

4. A system for adding virtual camera location data to computer-generated images, comprising a nontransitory tangible computer-readable storage medium that stores digital data representing a three-dimensional model of an object, an input device, a display device and a computer system, wherein the computer system is configured to perform the following operations:

(a) controlling the display device to display a computer-generated default image of at least a first portion of the object as pixels using the three-dimensional visualization application to process the digital data representing the three-dimensional model of the object, the computer-generated default image having a default viewpoint;

(b) controlling the display device to change the default viewpoint using the three-dimensional visualization application to process the digital data representing the selected three-dimensional model in response to movement of the input device by a user, the viewpoint being changed until a computer-generated first image of a second portion of the object having a first viewpoint of interest different than the default viewpoint is displayed;

(c) constricting a first digital image file in accordance with the standards of the Exchangeable Image File format, the first digital image file containing, in a part reserved for image data, first digital image data corresponding to the computer-generated first image and containing, in a part reserved for metadata, first and second tags that respectively contain digital data representing a first apparent location of a virtual camera corresponding to the first viewpoint of interest, wherein the first apparent location includes a first position including x, y and z coordinates of the virtual camera in a frame of reference of the object and a first orientation including yaw, pitch and roll angles of a first virtual line-of-sight of the virtual camera in the frame of reference of the object;

(d) storing the first digital image file in the nontransitory tangible computer-readable storage medium;
(e) retrieving the first digital image file from the nontransitory tangible computer-readable storage medium;
(f) displaying a stored first image based on the first digital image data of the retrieved first digital image file;
(g) placing the stored first image onto a display screen of the three-dimensional visualization application by a drag-and-drop manipulation;
(h) extracting, by the three-dimensional visualization application, the digital data representing the first position and the first orientation of the virtual camera from the first digital image file associated with the stored first image; and
(i) re-creating and displaying, by the three-dimensional visualization application, the computer-generated first image of the second portion of the object using the three-dimensional visualization application to process three-dimensional model data, the re-created computer-generated first image having the first viewpoint of interest.

5. The system as recited in claim 4, wherein the computer system is configured to perform operations (a) through (c) in response to user inputs.

6. The system as recited in claim 4, wherein the computer system is further configured to perform the following operations:
(j) controlling the display device to change the first viewpoint of interest using the three-dimensional visualization application to process the digital data representing the selected three-dimensional model in response to movement of the input device by a user, the viewpoint being changed until a computer-generated second image of a third portion of the object having a second viewpoint of interest different than the first viewpoint of interest is displayed;
(k) constructing a second digital image file in accordance with the standards of the Exchangeable Image File format, the second digital image file containing, in a part reserved for image data, second digital image data corresponding to the computer-generated second image and containing, in a part reserved for metadata, first and second tags that respectively contain digital data representing a second apparent location of a virtual camera corresponding to the second viewpoint of interest, wherein the second apparent location includes a second position including x, y and z coordinates of the virtual camera in a frame of reference of the object and a second orientation including yaw, pitch and roll angles of a second virtual line-of-sight of the virtual camera in the frame of reference of the object; and
(l) storing the second digital image file in the nontransitory tangible computer-readable storage medium.

7. The system as recited in claim 6, wherein the computer system is further configured to compute an offset matrix representing a relative offset between the first and second viewpoints of interest in response to a user input.

8. A method for adding virtual camera location data to computer-generated images, comprising:
displaying a computer-generated first image having a first viewpoint of interest using a three-dimensional visualization application to process digital data representing a three-dimensional model of an object;
selecting the computer-generated first image for storage in a nontransitory tangible computer-readable storage medium;
constructing a first digital image file in accordance with the standards of the Exchangeable Image File format, the first digital image file containing, in a part reserved for image data, first digital image data corresponding to the computer-generated first image and containing, in a part reserved for metadata, first and second tags that respectively contain digital data representing a first apparent location of a virtual camera corresponding to the first viewpoint of interest, wherein the first apparent location includes a first position including x, y and z coordinates of the virtual camera in a frame of reference of the object and a first orientation including yaw, pitch and roll angles of a first virtual line-of-sight of the virtual camera in the frame of reference of the object;
storing the first digital image file in the nontransitory tangible computer-readable storage medium;
retrieving the first digital image file from the nontransitory tangible computer-readable storage medium;
displaying a stored first image based on the first digital image data of the retrieved first digital image file;
placing the stored first image onto a display screen of the three-dimensional visualization application by a drag-and-drop manipulation;
extracting, by the three-dimensional visualization application, the digital data representing the first position and the first orientation of the virtual camera from the first digital image file associated with the stored first image; and
re-creating and displaying, by the three-dimensional visualization application, the computer-generated first image of the second portion of the object using the three-dimensional visualization application to process three dimensional model data, the re-created computer-generated first image having the first viewpoint of interest.

9. The method as recited in claim 8, further comprising:
navigating from the first viewpoint of interest to a second viewpoint of interest different than the first viewpoint of interest using the three-dimensional visualization application to process the digital data representing the three-dimensional model;
selecting a computer-generated second image for storage in the nontransitory tangible computer-readable storage medium;
constructing a second digital image file in accordance with the standards of the Exchangeable Image File format, the second digital image file containing, in a part reserved for image data, second digital image data corresponding to the computer-generated second image and containing, in a part reserved for metadata, first and second tags that respectively contain digital data representing a second apparent location of a virtual camera corresponding to the second viewpoint of interest, wherein the second apparent location includes a second position including x, y and z coordinates of the virtual camera in a frame of reference of the object and a second orientation including yaw, pitch and roll angles of a second virtual line-of-sight of the virtual camera in the frame of reference of the object; and
storing the second digital image file in the nontransitory tangible computer-readable storage medium.

10. The method as recited in claim 9, further comprising computing a position and orientation representation of a relative offset between the first and second viewpoints of interest.

* * * * *